United States Patent
Corcoran et al.

[15] 3,689,851
[45] Sept. 5, 1972

[54] PHASE-LOCKED FAR INFRARED LASER

[72] Inventors: Vincent J. Corcoran, Orlando, Fla.; Richard E. Cupp, Boulder, Colo.; James J. Gallagher, Orlando, Fla.

[73] Assignee: Martin Marietta Corporation, New York, N.Y.

[22] Filed: Oct. 20, 1970

[21] Appl. No.: 82,256

[52] U.S. Cl. .................331/94.5, 325/445, 329/161
[51] Int. Cl. ..............................................H01r 3/00
[58] Field of Search.......................................331/94.5

[56] References Cited

UNITED STATES PATENTS 3,548,338   12/1970   Kojiro Kinoshita et al............................331/94.5

OTHER PUBLICATIONS

Corcoran et al.: IEEE Journal of Quantum Electronics, vol. QE–5, pp. 424–426, August, 1969

Primary Examiner—Ronald L. Wibert
Assistant Examiner—Edward S. Bauer
Attorney—Julian C. Renfro and Gay Chin

[57] ABSTRACT

A technique for stabilizing a gas laser to a frequency standard, and more particularly to the use of a phase lock loop in which the laser and its power supply are disposed, with the output of the laser being arranged to be compared with a multiplied frequency standard. In this invention the laser output is mixed with the multiplied frequency standard in a mixer, with the beat frequency from the mixer being compared to a radio frequency reference in a phase detector. The output of the phase detector is sent to a current controller which varies the laser power supply current, thus selectively changing the frequency of the laser. If the laser fluctuates in phase, a control signal brings the beat frequency signal back in phase with the reference input to the phase detector. As a result, a hydrogen cyanide laser phase locked in accordance with this invention has produced an output signal whose beat is less than 50 Hz wide, with a long term stability of less than 10 Hz.

6 Claims, 4 Drawing Figures

INVENTORS
VINCENT J. CORCORAN
RICHARD E. CUPP
JAMES J. GALLAGHER

BY Julian C. Renfro
ATTORNEY

PHASE-LOCKED FAR INFRARED LASER

BACKGROUND OF THE INVENTION

Whereas other laser stabilization techniques have entailed stabilizing a laser by the use of another laser, which itself is inherently unstable, and lasers have been stabilized by techniques in which the laser frequency is varied so that only long term stability results, this novel and inventive technique is the first in which a laser is stabilized to an inherently stable device so that long and short term stabilization results and the bandwidth of the laser signal is actually narrowed.

There were three major problem areas we encountered in stabilizing a gas laser so that it could be used as a frequency standard. First, we had to get a larger signal out of our mixer, that is, it had to have a more favorable signal-to-noise ratio. Then, we had to passively stabilize the HCN laser we used, which involved eliminating sources of vibration, mechanical and acoustical, and the current fluctuations in the power supply which caused the frequency of the HCN laser to vary. Thirdly, we had to find a current controller capable of taking the signal from the phase detector and which was capable of varying the current in the HCN laser power supply so that by the functioning of the feedback loop, the frequency could be controlled.

We achieved the goal of obtaining a more favorable signal to noise ratio out of the mixer by increasing the power output of the HCN laser and by continuing run-ins of a point contact multiplier we used as the mixer. The effectiveness of a point contact multiplier requires application of the art of pointing and running in until the desired signal is produced. This operation is conducted by the operator turning a micrometer type device that moves a silicon post with respect to a whisker. A signal on a scope indicates when the signal is of sufficient amplitude. The signal to noise ratio for the 27.36695 MHz IF signal we used was typically greater than 10 to 1, which is the desirable minimum signal to noise ratio needed for phase locking.

We then determined the sources of instability of the HCN laser by beating its output with the output of another HCN laser. In this way we could determine whether mechanical or acoustical vibrations, or fluctuations in the power supply were the sources of the instability. We found that mechanical vibrations were an important source of instability and we reduced these by mounting the HCN laser tube on a prestressed concrete block and isolating the block from the floor of the building with inflated tubes. Acoustical vibrations were not considered to be a major source of instability.

Current fluctuations in the power supply were reduced primarily by using a large LCR filter at the output of the supply. Thus, by mechanical isolation and electrical filtering, we were able to reduce the fluctuations in the output of the HCN laser to a point where the signal could be used in an active control system to phase lock the laser. That is, the signal remained within the range of operation of the FEL 13A synchronizer we used.

The third step that was necessary in order that the phase locking of the HCN laser could be accomplished was the constructing of a Current Controller that could be used to change the current through the gas discharge when the laser changed frequency or phase. This was accomplished by operating a control device in series with the laser and power supply. The device was basically a common emitter transistor circuit with the collector load in series with the power supply and laser tube. The input control signal was fed to the base of the circuit transistor so that small changes in control signal could influence the current in the transistor collector circuit and hence through the gas discharge.

SUMMARY OF THE INVENTION

A phase lock loop in accordance with this invention involves a gas laser having a power supply and a discharge tube in which a gas discharge is produced, and through which a current flows, with the power supply being capable of supplying variable current so that the laser output can be varied in frequency. Current controller means are provided for the power supply, for controlling the current flow through the laser, and phase detector means are utilized for generating a control signal substantially proportional to the difference in phase of two input signals to said phase detector. One of these input signals is a stable reference, and the other is a beat frequency signal out of a mixer means, with the mixer means being arranged to receive the output of the gas laser and also a signal generated from a frequency standard. The mixer produces therefrom the beat frequency output signal, whose frequency is the difference between the laser signal frequency and the standard signal frequency, which output signal is delivered to said phase detector means to be compared with the reference signal. The control signal from the phase detector means is of course delivered to the current controller means so as to closely control the current flow of said laser, thus assuring a frequency stable output.

It is a principal object of our invention to provide a phase locked laser capable of serving as a frequency standard, and as a stable, narrow linewidth source for transmitting and receiving applications.

It is another object of our invention to provide a phase lock loop usable in conjunction with a gas laser, serving to stabilize the output of the laser in a highly satisfactory manner.

It is yet another object of our invention to provide a technique for modulating the output of gas lasers which have the characteristic of producing output signals whose frequencies change as current through the lasers changes.

The latter technique is capable of producing frequency modulation of the laser output and also amplitude modulation in those cases where the intensity of the output varies as a function of frequency.

These and other objects, features and advantages of this invention will be more apparent from a study of the appended drawings in which.

DETAILED DESCRIPTION

Figure 1:
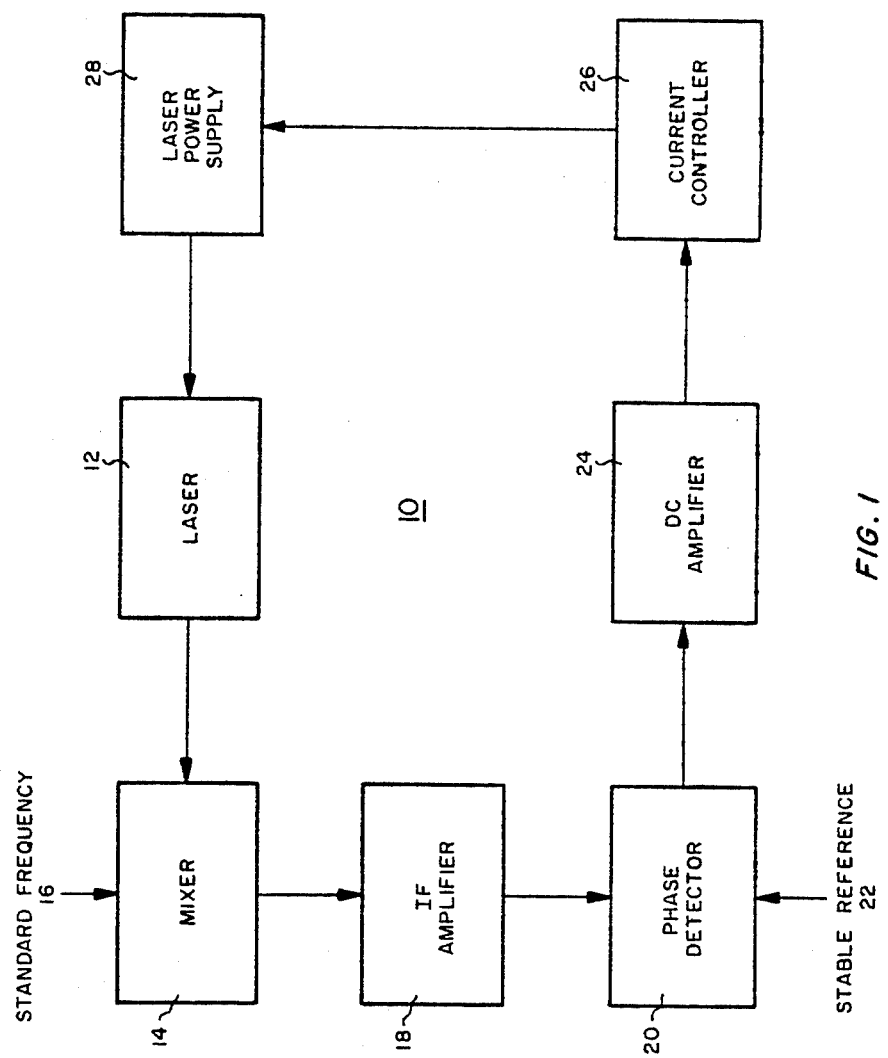
FIG. 1 is a simplified block diagram of a preferred embodiment of the phase lock loop portion of this invention.

The basic technique for the phase lock of a gas laser in accordance with our invention is illustrated in FIG. 1, wherein the significant components of the control loop 10 are shown by means of a block diagram. The gas laser is generally indicated at 12, with its output being directed into mixer 14. The beat generated in the mixer 14 between the laser and the output 16 of a multiplied frequency standard is amplified by IF amplifier 18 if necessary, and compared in a phase detector 20 to a stable reference 22. It should be noted that if the signal level out of the mixer 14 is large enough for the phase detector to operate in its linear region, then the amplifier 18 is not needed.

The output of the phase detector 20 is amplified and filtered by DC amplifier 24, and then provided to a current controller 26. However, the DC amplifier 24 is not needed if the phase detector output is large enough to drive the current controller. When the beat frequency is not in phase with the reference signal 22, then a correction voltage is fed from the phase detector 20 to current controller 26, which is connected to the laser power supply 28, so that any change in the phase detector output changes in the proper direction, the current flowing through the gas discharge. The current change in the laser discharge changes the output frequency of the laser 12, and thus, by the functioning of our apparatus, the beat frequency output is caused to go back in phase with the stable reference 22. In this preferred embodiment the laser frequency was 890,758.735 MHz.

Figure 2:
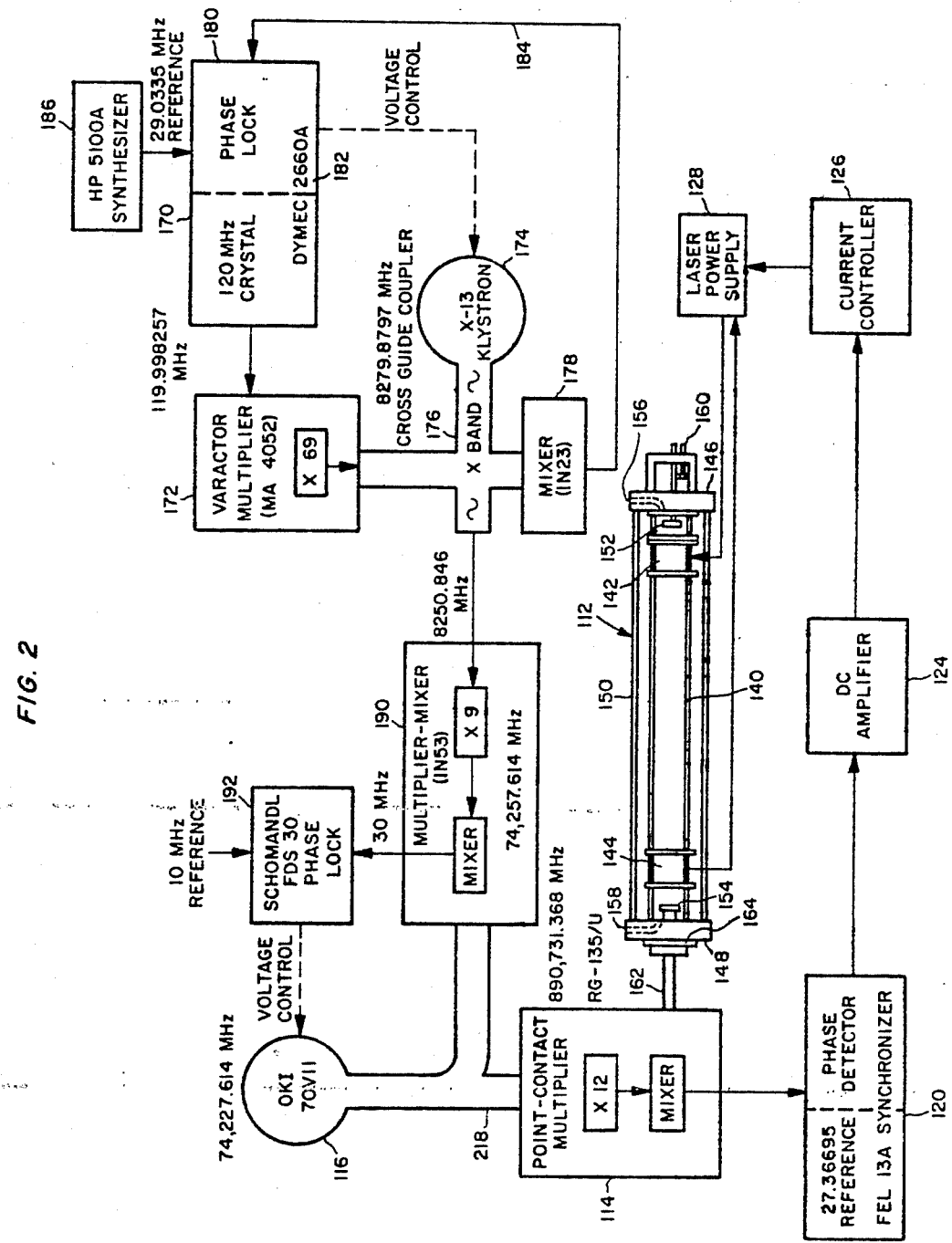
FIG. 2 is a more detailed showing, revealing a gas laser stabilized by phase locking the beat between it and a multiplied frequency standard to a stable reference in a phase detector.

It will be noted in FIG. 2 that we have there shown an exemplary block diagram representative of the operational components associated with the phase locking of a gas laser in accordance with out invention. In this arrangement, the output signal from the hydrogen cyanide laser 112 is mixed with a standard frequency, which in this instance was generated by multiplying the signal from a phase locked OKI70V11 klystron 116 in a point contact multiplier 114. Although this constituted our specific standard frequency, when we refer to a standard frequency or frequency standard we mean this term to comprehend and include either a fixed frequency signal, or a short term stable signal that is tunable or settable to discrete frequencies.

Figure 3:
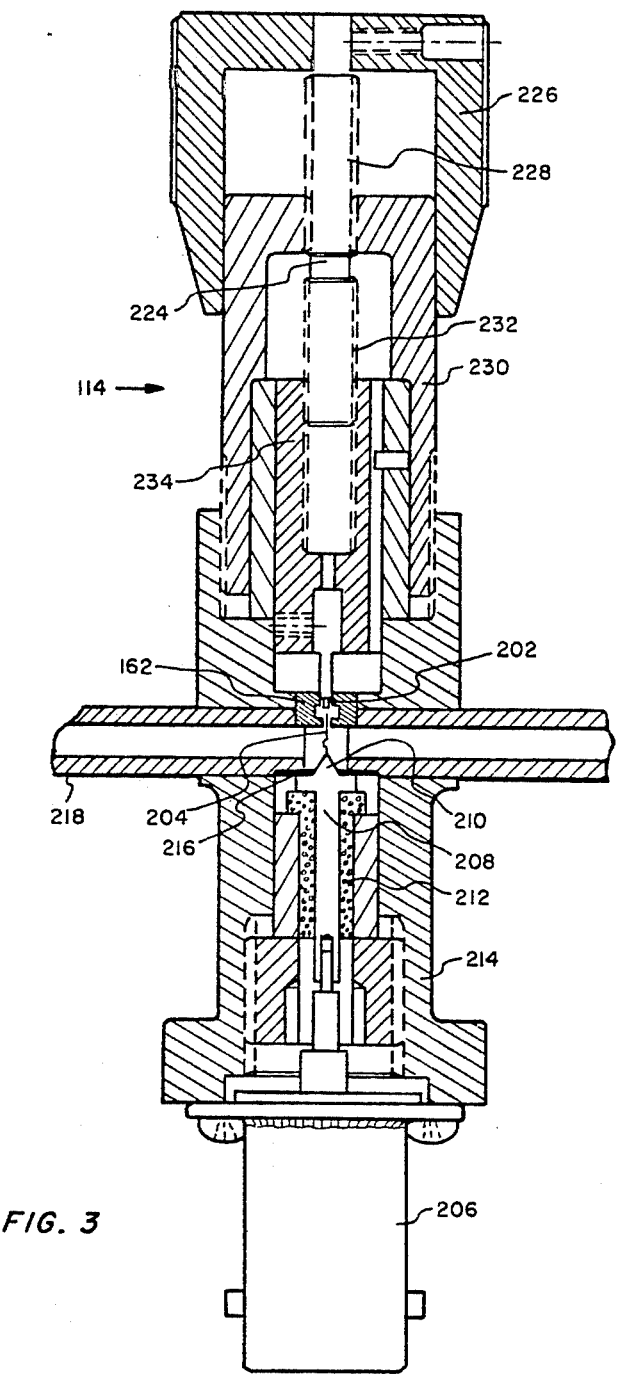
FIG. 3 is a cross sectional view of the point contact multiplier employed as the mixer in our apparatus.

The point contact multiplier device is discussed in detail in conjunction with FIG. 3, and as will be seen, it also acts as the mixer, thus generating the beat between this multiplied standard frequency represented by the klystron output, and the laser signal. The beat frequency signal was compared to a reference signal in a synchronizer 120, which provides the internal reference signal for the phase detector portion of this device, and the IF amplification for the beat frequency signal coming from the mixer 114. Although a specific reference signal was provided in this particular instance, as shown in FIG. 2, when we refer to a stable reference we mean the term to comprehend and include either a fixed frequency radio frequency signal or a radio signal whose frequency spectrum is reasonably pure, but which is tunable or settable to a discrete frequency. For the exemplary version of our invention, we preferred to use a synchronizer made by the Frequency Engineering Laboratories of Farmingdale, N.J., Model FEL13A.

When the FEL13A synchronizer is used for phaselocking, the internal amplification of the device is sufficient so that the output of the point contact multiplier is fed directly into the phase detector portion of the device 120. The phase detector in the FEL13A synchronizer produces a signal voltage which is proportional to the phase fluctuation between the beat frequency signal generated in the mixer 114, and the reference frequency in the synchronizer 120. The output of the phase detector portion of the synchronizer is then fed to a DC amplifier 124 which amplifies the voltage from the phase detector to a level sufficient to properly operate the current controller 126.

The amplifier 124 may consist of three cascaded stages of K2XA operational amplifiers which are manufactured by Philbrick Researchers, Inc., Boston, and the combination has a gain of approximately 25, with the high frequency 3 db point occurring below 10 KHz. This amplifier may also filter out high frequency components of the phase detector output.

The current controller 126 is used to change the current through the gas discharge in response to a signal input to the device. In the embodiment of the device according to FIG. 2, the current controller circuit is a 2N5385 transmitter in a common emitter configuration with the collector load connected to the laser tube. The signal on the base of the transistor controls the operating point of the transistor which has a small variation in current for variable loads and fixed base current. The details of the current controller circuit are shown in Volume QE-6, March 1970 of the IEEE Journal of Quantum Electronics on page 160. Other methods may be used for current control and in fact, another circuit is shown in the Journal of Quantum Electronics on page 241 of Volume QE-6, April 1970.

The current controller 126 is in series with the laser power supply 128 and hydrogen cyanide laser 112 so that any changes in the phase detector output change the current through the hydrogen cyanide gas discharge. The current changes thus change the frequency of the laser in such a direction that the laser output is caused to be in phase with the multiplied standard frequency.

In the preferred embodiment shown in FIG. 2, we used an HCN laser utilizing a 4 inch inner diameter, 7 foot long Kimax tempered glass pipe to form the discharge tube 140. Concentric, water cooled, stainless steel cathode 142 and anode 144, which are of physically the same construction, are connected to the discharge tube. Mirror mounts 146 and 148 that house the resonator reflectors are connected to the cathode and anode. Three or so 1 inch invar rods 150 are used to stabilize the dimension of the resonator by connecting the mirror mounts 146 and 148 together. These mirror mounts 146 and 148 support the mirrors 152 and 154, respectively, each of which is a spherical brass mirror with a 20 foot radius of curvature. The output mirror 154 has a 0.275 inch diameter hole in the center to couple out the radiation.

The mixture used to generate the HCN was ethyl ether and ammonia, which are continuously added through the port 158 disposed in the output mirror mount 148. An electrical current from power supply 128 is caused to pass between cathode and anode, and this creates a gas discharge, one of whose constituents is HCN. This mixture flows through the gas discharge tube, and out through an outlet port 156 on the rear mirror mount 146. A Welch 1402 fore pump with a long suction line continuously pumps the mixture through the tube and out from the port 156. The anode is grounded and the cathode is at a negative voltage, in the range of 800 – 1200 V, and it is for this reason that the long suction line between the HCN laser and the fore pump is needed, so that the voltage from the cathode does not discharge through the fore pump.

A mechanical coupling involving a gear train 160 was made to the rear mirror 152. This coupling can be used to translate the mirror 152, thereby tuning the length of the resonator to the desired frequency of the HCN laser. The tuning can be performed by hand, or a drive motor can be utilized.

A waveguide coupler 162, which may be a RG135 waveguide, may be used to take the radiation from the output mirror 154, and to connect the HCN output to the point contact multiplier 114. A quartz window 164 adjacent the mirror mount transmits the radiation to the waveguide coupler and allows the low pressure of from 50 microns to 1 millimeter of mercury to be maintained in the laser tube.

Other gas laser tubes can be used, and more specifically, a number of HCN laser configurations would be satisfactory to produce the needed output frequency. Obviously, the diameter and length of the discharge tube can be changed. Various metals other than stainless steel have been used as cathode and anode, not only in concentric configurations but with a hollow tube design in a side arm as well. Mirrors may be mounted external to the gas discharge as well as internal. When mirrors are mounted externally, Brewster windows made of polypropylene or other materials having low absorption and high transmission in the wave length range of interest can be used on the ends of the discharge tube. Other stable materials such as Cer-Vit can be used in place of Invar for the stabilizing rods of the laser.

The entire laser is preferably mounted on a prestressed concrete block or the like, and the block isolated from the floor with air filled inner tubes, thus to reduce mechanical vibrations. Other techniques such as mechanically isolated tables can be used to reduce the mechanical vibration.

In the preferred embodiment illustrated in FIG. 2, the signal from the klystron 116 was stabilized to a 120 MHz crystal 170 through a multiplier chain which incorporated two phase lock loops. In the first phase lock loop, the signal from the crystal 170 was multiplied by 69 in a MA 4052 Varactor multiplier 172. This signal, along with the signal from an X-13 klystron 174, is fed to an X band commercially available cross guide coupler 176 to which a 1N23 mixer 178 is connected, with the signal being mixed with the signal from the klystron in the mixer. The beat frequency from the mixer 178 was then fed to the phase detector portion 180 of a Dymec 2660A synchronizer 182 by a lead 184. The beat frequency signal was compared in device 182 to a 29.0335 MHz reference signal that was derived from a Hewlett Packard 5100A synthesizer 186. An output voltage is generated in the Dymec 2660A synchronizer which is proportional to the fluctuation in phase of the beat frequency signal compared to the 29.0335 MHz reference. This control voltage is then fed to the reflector of the X-13 klystron 174 to bring the beat frequency signal in phase with the 29.0335 MHz reference from synthesizer 186.

A portion of the stabilized X-band signal is coupled out of the cross guide coupler 176 to a 1N53 multiplier mixer 190. In this latter device the X-band signal is multiplied by 9 and mixed with the 74,227.614 MHz signal from the klystron 116. The difference frequency that is generated at 30 MHz is fed to a Schomandl FDS 30 Phase Lock 192, otherwise known as a Syncriminator. The 30 MHz signal is compared with a reference in the Phase Lock device that is created in the phase lock device, by multiplying a 10 MHz reference by three, and a voltage is generated in this device which is proportional to the difference in phase between the reference and the signal from the 1N53 multiplier mixer 190. This voltage is then fed to the reflector of the klystron 116 to bring the beat frequency signal in phase with the reference in the Phase Lock 192. In this way, the klystron 116, whose function was discussed in conjunction with FIG. 2, has been stabilized to the signal from the 120 MHz crystal 170.

Referring now to FIG. 3, it will be seen that we have there shown in greater detail the point contact multiplier 114 utilized in accordance with our invention. The essential elements of the device are a crystal or chip 202 and a tungsten whisker 204. Although in the preferred embodiment we utilized for chip 202, a piece cut from the crystal of a commercial 1N23 diode, a wide variety of materials may be used, such as gallium arsenide, indium antimonide, germanium, or other pieces of silicon. The tungsten whisker 204, which is preferably electronics grade tungsten wire, can also be selected from a variety of metal wires, including phosphor bronze. As will be obvious to one skilled in the art, tungsten wire is most often used with a silicon chip, and phosphor bronze wire is typically used with a gallium arsenide chip.

In the point contact multiplier we used, the tungsten whisker 204 is connected electrically to a commercially available coaxial BNC connector 206 through the whisker mount 208 shown in the drawing. Member 208 is preferably brass and the whisker is soldered to an upraised tip 210 of the member 208. The member 208 in turn is supported by a Rexolite sleeve 212 that serves to insulate the member 208 from the housing 214. A cylindrical brass sleeve may surround sleeve 212, being used as a mounting for the sleeve, and simplifying assembly procedures. It should be noted that a mica washer 216 is used to insulate the upper portion of member 208 from the wall of waveguide 218, which is a RG 98 waveguide used to couple the output from the klystron 116 into the multiplier 114.

The connector member 206 may be regarded as extending upwardly into contact with member 208. More particularly, the center conductor of the BNC is electrically and mechanically in contact with a recess in the lower portion of member 208. The illustrated BNC Connector 206 of course is a female member designed to receive a male member that in turn receives the output from the multiplier-mixer 114, and delivers it to the device 120.

It should be noted that chip 202 can be caused to move with respect to waveguide 162, which is the RG 135 waveguide connected from the laser 112, in which waveguide a hole has been provided, into which the chip may be moved.

Contact between the tungsten whisker 204 and the silicon chip 202 is made by means of the differential screw 224 to the lower end of which the silicon chip is mounted. In other devices that we have used, the tungsten whisker is mounted to the differential screw; either configuration is usually satisfactory.

The differential screw operates when the knurled outer knob 226 is rotated. The screw 224 has two different threads, a coarse thread 228 that is threadedly received in member 230 that is fixed to housing 214, and a fine thread 232 that is threadedly received in post mounting member 234, that can move vertically as shown in FIG. 3, without rotating. Thus, rotation of the knob in one direction moves the assembly toward the whisker through the action of the coarse thread 228. At the same time, the fine thread 232 draws the post mounting member 234 and the chip 202 away from the whisker. By this conventional differential screw arrangement we obtain very fine mechanical adjustment of the chip with respect to the whisker.

Figure 4:
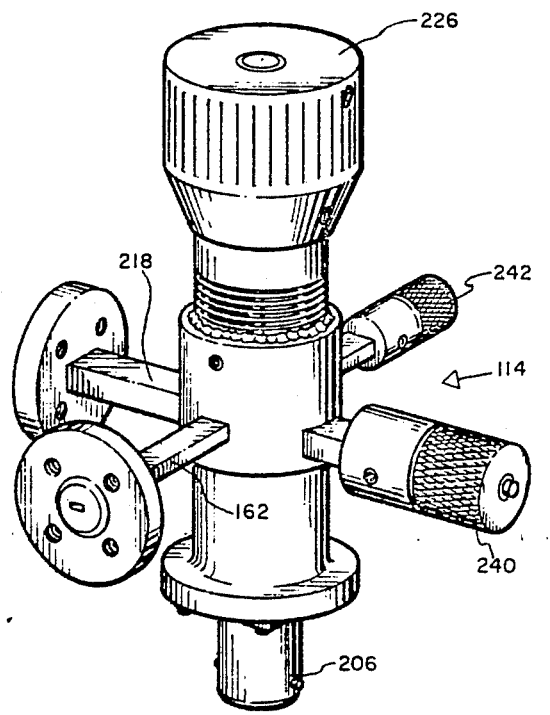
FIG. 4 is a perspective view of the point contact multiplier.

Energy from the microwave and laser sources is coupled into the interacting region by means of the crossed waveguide arrangement, with the hole through the crossed area being sufficient in size to allow the passage of the point contact junction. As shown in FIGS. 3 and 4, waveguides 162 and 218 cross at a right angle, with the waveguide 162 being used to couple the HCN laser signal, and the waveguide 218 being that through which energy from the 70V11 klystron 116 is coupled.

Turning now to FIG. 4, it will be noted that we have illustrated the point contact multiplier 114 so as to reveal the manner in which the waveguides cross, and the use of adjustment knobs 240 and 242 that enable plungers (not shown) in each of waveguides 218 and 162 to be moved. This of course makes it possible to tune the signals by setting up standing waves in the waveguides. This is to say, the plungers are manipulated until the interaction of the signal from the OKI 70V11 klystron 116 into the wire or whisker is maximized. This is of course accomplished after the point contact multiplier has been run-in.

The device shown in our FIGS. 3 and 4 is essentially a state of the art component, variously known as a harmonic generator, as used in FIG. 12 of Spectroscopy at Radio and Microwave Frequencies by D. J. E. Ingram (Butterworth's Scientific Publications, London 1955); as a multiplier, as used on pages 50 and 51 of Microwave Spectroscopy by Gordy, Smith and Trambarulo (John Wiley and Sons 1953); and as a mixer. No claim to invention by us is made herein.

Although we have shown and described our invention in conjunction with certain devices, certain frequencies, and the like, we are not to be limited to these, and for example, in place of the klystrons 116 and 174, we can use carcinotrons or even certain solid state devices.

Also, in place of the 120 MHz crystal 170, we can use any one of a number of stable sources including atomic frequency sources, such as for example rubidium, or masers, such as an ammonium gas maser.

We claim:

1. In a gas laser whose output frequency depends on the amount of current flow through the gas discharge of said laser, a power supply, a current controller for controlling the flow of current out of said power supply and through the gas discharge of said laser, a phase detector for producing a signal which is proportional to the phase difference between a stable reference signal and a beat frequency signal generated by mixing the output of the gas laser and a multiplied frequency standard, the signal from said phase detector being coupled to control the output of said current controller to reduce said phase difference, thus to bring about the frequency stabilization of said gas laser.

2. In a gas laser having an output, the frequency of said output depending at least to some extent on the amount of current flow through the gas discharge of said laser, a current controller for controlling the flow of current through the gas discharge of said laser, a phase detector for producing a signal which is proportional to the phase difference between a stable reference signal and a beat frequency signal generated by mixing said laser output with a frequency standard supplied by a frequency standard generating means, said phase detector being operatively connected to control the functioning of said current controller in such a way that the current through said gas discharge is controlled to reduce said phase difference, thus to assure a stable output frequency of said laser.

3. A phase lock loop utilized in conjunction with a gas laser and a frequency standard, comprising a gas laser having a power supply and a discharge tube in which a gas discharge is produced, and through which a current flows, said power supply being capable of supplying variable current through said discharge tube so that the laser output can be varied in frequency, current controller means for said power supply, for controlling the current flow through the laser, phase detector means for generating a control signal substantially proportional to the difference in phase of two input signals to said phase detector, with one of these input signals being a stable reference, and the other being a beat frequency signal out of a mixer means, said mixer means being arranged to receive the output of said laser and also a signal generated from a frequency standard, and to produce therefrom said beat frequency output signal, whose frequency is the difference between the laser signal frequency and the standard signal frequency, which output signal is delivered to said phase detector means to generate said control signal which is proportional to the phase difference between the phase of said output signal and the phase of the reference signal, said control signal from said phase detector means being delivered to said current controller means so as to closely control the current flow through said gas discharge to reduce said phase difference, thus assuring a frequency stable output.

4. The phase lock loop as defined in claim 3 in which said mixer means is a point contact multiplier.

5. The phase lock loop as defined in claim 3 in which said frequency standard is provided by a klystron whose output has been stabilized to a fixed reference.

6. The device as defined in claim 5 in which two phase lock loops are utilized for stabilizing said klystron.

* * * * *